UNITED STATES PATENT OFFICE.

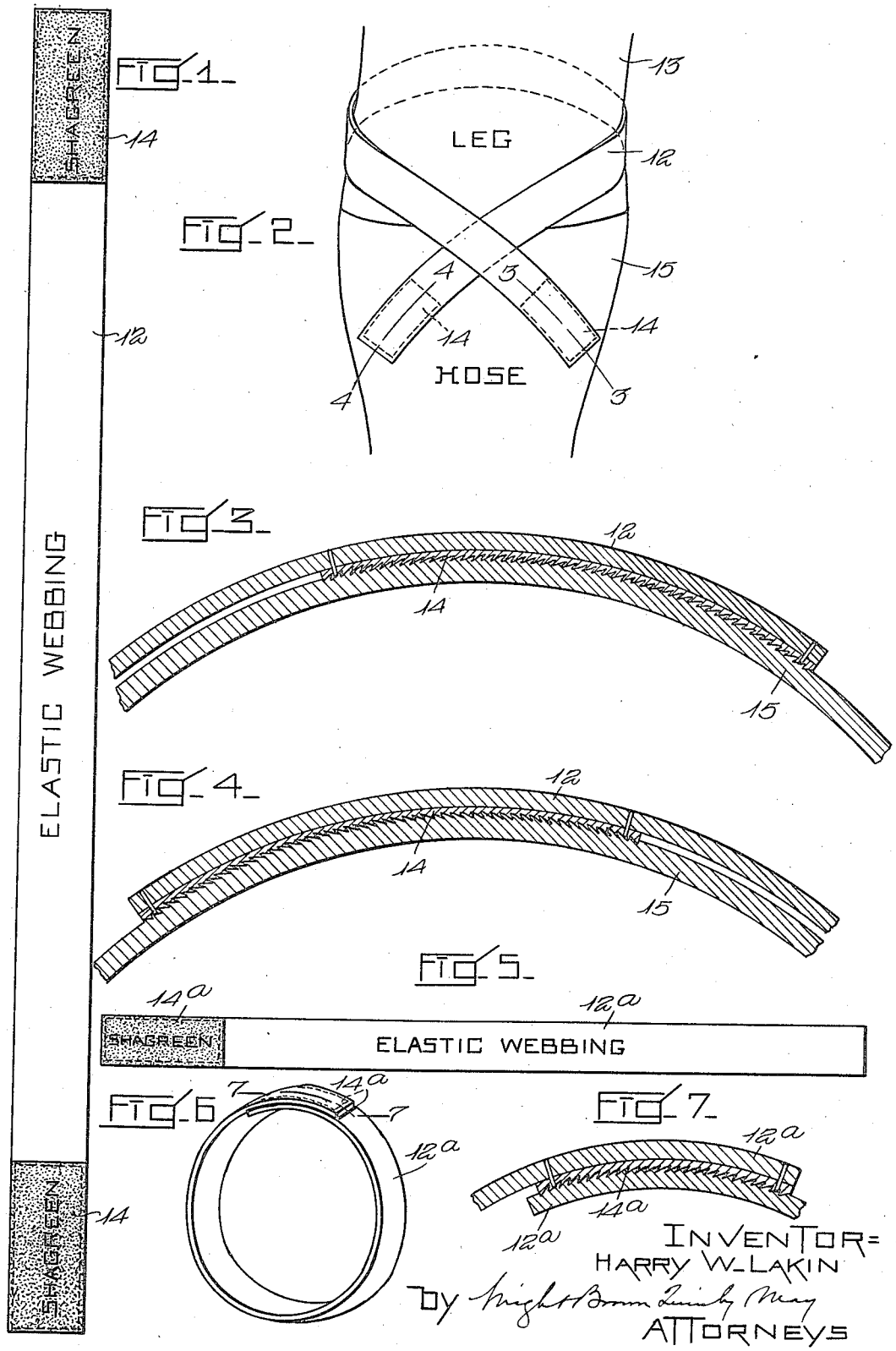

HARRY W. LAKIN, OF BOSTON, MASSACHUSETTS.

ELASTIC LIGATURE.

1,237,660.  Specification of Letters Patent.  Patented Aug. 21, 1917.

Application filed June 19, 1916. Serial No. 104,373.

*To all whom it may concern:*

Be it known that I, HARRY W. LAKIN, a citizen of the United States, residing at Boston, in the county of Suffolk and State of Massachusetts, have invented new and useful Improvements in Elastic Ligatures, of which the following is a specification.

This invention relates particularly to elastic ligatures adapted to embrace a human limb, and having means for engaging a portion or portions of a garment thereon, the ligature being adapted to contract longitudinally when elongated from its normal length, and serving by its contraction to exert contractile pressure on the limb for a useful purpose, such as supporting a hose leg.

The invention has for its object to provide improved means operable by the contraction of the ligature to firmly connect the ligature with a fibrous surface, such as the outer side of a hose leg, without sufficiently penetrating said surface to injure or in any way disfigure the same, the connection being made by pressing the connecting means against said surface while the ligature is extended and then allowing the ligature to partially contract, and broken by separating the connecting means from said surface.

In the preferred embodiment of my invention the ligature is composed of a strip of elastic webbing and tips of shagreen, which, as is well known, is the dried skin of a littoral form of shark known as a dog fish. This skin is covered with minute, pointed, closely set papillæ constituting teeth, which are inclined in one direction, so that although the teeth are practically invisible to the naked eye, they are perceptible by the resistance experienced in moving a finger over a strip of shagreen in one direction, and the lack of resistance experienced when the finger is moved in the opposite direction.

I have discovered that a strip of shagreen attached as a tip to a strip of elastic webbing, when pressed against a hose leg and pulled endwise in a given direction, causes the papillæ or teeth to embed themselves in the fibrous material of the leg and establish a firm connection between the ligature and the hose leg while the ligature is under tension, that the shagreen tip is separable from the hose leg by a direct outward movement of the tip without injury to the fibers of the hose leg, and that no trace of the engagement of the tip with the hose leg is left on the latter, so that silk or other delicate fabrics are not injured or defaced in any way by the engagement of the tip therewith.

Of the accompanying drawings forming a part of this specification:

Figure 1 represents a side view of a ligature embodying my invention, formed as a hose supporter;

Fig. 2 represents a perspective view illustrating the operation of the ligature shown by Fig. 1;

Figs. 3 and 4 represent enlarged sections on lines 3—3 and 4—4 of Fig. 2;

Fig. 5 represents a side view of a ligature adapted for use as a sleeve contractor;

Fig. 6 represents a perspective view illustrating the operation of the ligature shown by Fig. 5;

Fig. 7 represents an enlarged section on line 7—7 of Fig. 6.

The same reference characters indicate the same or similar parts in all the views.

Referring to Figs. 1, 2, 3 and 4, 12 represents a strip of elastic webbing forming a ligature adapted to embrace a human leg 13, as indicated by Fig. 2, and 14, 14, represent tips of shagreen attached by stitches or otherwise to the end portions of the strip.

The minute, pointed, closely set papillæ or teeth, which characterize shagreen made from the skin of a dog fish, are illustrated as on the exposed inner sides of the tips 14, but it is obvious that they may be placed on either side and the teeth of one tip are inclined oppositely to those of the other tip, as will be seen by comparing Fig. 3 with Fig. 4. In other words, the teeth of each tip are inclined from their roots toward the opposite end portion of the strip. Figs. 3 and 4 show teeth conventionally and magnified out of proportion to the thickness of the tips, no attempt being made to show the actual form of the teeth.

When the ligature thus formed is wrapped around the leg as shown by Fig. 2 (the tips facing inwardly), and the tips are pressed against a hose leg 15 while the strip 12 is elongated and under tension, the effort of the strip to contract embeds the teeth in the surface fibers of the hose leg so that each tip is anchored to the fabric against movement of the pull exerted on it by the strip, and is not accidentally separable from the hose leg. The engagement of the tips with the hose leg occurs after a slight longitudinal contraction of the strip, and prevents further contraction thereof, so that an operative elongation of the strip is maintained. When, however, either tip is pulled lengthwise to slightly elongate the strip, its teeth are withdrawn from the hose leg fibers, so that the tip is movable laterally from the hose leg. The strip is thus relieved from tension, so that the other tip 14 simply falls away from the hose leg, or in other words is automatically disengaged therefrom.

A hose supporter thus constructed is adapted to be quickly applied and removed, is securely held against accidental displacement when applied, and when removed leaves no trace on the hose leg of its previous engagement therewith. The shagreen is just as flexible as a piece of cloth and does not destroy or impede the flexibility of the strip to which it is attached.

The embodiment of the invention shown by Figs. 5, 6 and 7, is suitable for use in contracting a shirt sleeve on the arm of the wearer, and comprises a strip 12$^a$ of elastic webbing and a tip 14$^a$ of shagreen attached to one end portion of the strip, the teeth being inclined from their roots toward the opposite end portion of the strip.

The ligature thus formed may be wrapped around a shirt sleeve to form a band, the tip 14$^a$ overlapping a portion of the fibrous surface of the strip 12$^a$, as shown by Fig. 6, so that its teeth are embedded in said surface, as indicated by Fig. 7, the inclination of the teeth being such as to maintain the elongation of the band.

I do not limit myself to shagreen as the material of the tip or tips of the ligature, although at present I know of no material comparable thereto for this purpose.

The papillæ of shagreen made from dogfish skin are so minute that when they are embedded in the surface fibers of a very thin fabric, such as a silk hose leg, they cannot penetrate to the inner side of the fabric, and cannot injure either the fabric or the skin of the wearer. The length of said papillæ or teeth is therefore such that they may be withdrawn from the fabric by a direct outward movement of the tip from the surface of the fabric, in a direction perpendicular to said surface, without injury to the fibers of the fabric, so that the operation of disengaging the ligature from the fabric is a very simple one and requires no particular care. As above stated, the operation of disengaging a hose-supporting ligature from a hose leg is partly automatic, one tip being automatically disengaged after the manual disengagement of the other tip.

Having described my invention, I claim:

1. A ligature comprising an elastic strip adapted to contract longitudinally when elongated, and a flexible tip adapted to conform to a curved surface, attached to an end portion of the strip, and surfaced with minute, pointed, closely set teeth, which are inclined from their roots toward the opposite end portion of the strip, and are adapted to be drawn by a partial longitudinal contraction of the strip into anchoring engagement with a fibrous surface against which the tip is pressed, said engagement maintaining an operative elongation of the strip, the length of said teeth being such that they are separable from said fibrous surface by a movement of the tip perpendicular thereto without injury to the fibers of said surface.

2. A hose supporting ligature comprising an elastic strip adapted to contract longitudinally when elongated, and two flexible tips adapted to conform to a curved surface, attached to opposite end portions of the strip, and surfaced with minute, pointed, closely set teeth, the teeth of each tip being inclined from their roots toward the opposite end portion of the strip, and adapted to be drawn by a partial longitudinal contraction of the strip into anchoring engagement with two portions of a hose leg against which the tips are pressed, said engagement maintaining an operative elongation of the strip, the length of said teeth being such that either tip is manually separable from the hose leg by a movement perpendicular to the surface of the leg without injury to the fibers thereof, and the manual separation of either tip from the hose leg permitting the complete contraction of the strip and the automatic separation of the other tip from the hose leg.

In testimony whereof I have affixed my signature.

HARRY W. LAKIN.